April 12, 1966 W. G. LIVEZEY 3,245,508

DAMPER

Filed Feb. 14, 1964

INVENTOR.
William G. Livezey
BY
A. N. Heiter
ATTORNEY

# United States Patent Office 3,245,508
Patented Apr. 12, 1966

3,245,508
DAMPER
William G. Livezey, Indianapolis, Ind., assignor to General Motors Corporation, Detroit, Mich., a corporation of Delaware
Filed Feb. 14, 1964, Ser. No. 344,950
5 Claims. (Cl. 192—107)

This invention relates to dampers and more particularly to vibration dampers for the friction plates of disc clutches and brakes.

The conventional multiple disc clutches and brakes employed in the drive establishing devices of transmissions, for example, generally have a plurality of engageable friction plates in which alternate friction plates have external teeth in mesh with the internal splines of an outer member and intermediate friction plates have internal teeth in mesh with the external teeth of an inner member to permit relative axial movement between the friction plates for friction plate engagement and the prevention of relative rotation between the inner member and outer member. In the case of a disc clutch, the outer member may be the driving member and the inner member may be the driven member or conversely the inner member may be the driving member and the outer member the driven member. In the case of a disc brake the inner member may be a drive establishing control member and the outer member a fixed reaction member or conversely the outer member may be the drive establishing control member and the inner member the fixed reaction member. In such disc clutches and brakes it is common to have metal to metal contact at the points of tooth and spline engagement.

In transmissions having constant mesh gearing, drive connected members of the clutches and/or brakes continuously rotate while the clutches and/or brakes are disengaged. It has been found that during such clutch and/or brake disengaged conditions, torsional vibrations of certain amplitudes and frequencies in the transmissions acting drive line such as may be excited, for example, by U-joints connecting the transmission to the load to be driven, and torsional engine vibrations, result in fracturing and breakage of the friction brakes, such fracturing and breakage being precipitated at the points of tooth and spline engagement which provide a drive connection to the active drive line. Furthermore, when the clutches and/or brakes are engaged, the meshing teeth and splines of the engaged clutch and/or brake receiving the torsional vibrations, hammer back and forth because of the normal clearance between the teeth and splines and will cause fracturing and breakage of the friction plates when the vibrations are of a certain amplitude and frequency.

The vibration damper of this invention dampens the effect of torsional vibrations on friction plates which have teeth adapted to mesh with the splines of a clutch or brake member. An annulus of resilient material is bonded to each side of the tooth portion of the friction plates and has tooth-shaped cutouts for receiving the splines. The friction plate teeth have a larger than normal clearance with regard to the splines whereas the resilient teeth formed by the cutouts have a normal clearance with regard to the splines. The friction plates when not engaged are carried on the splines by the projecting resilient teeth to dampen the effect of torsional vibrations on the friction plates. When the friction plates are engaged, the torque carried by the friction plates normally deflects the resilient teeth and the splines and friction plate teeth make metal to metal contact for transmitting the normal drive torque. The deflected resilient teeth while the friction plates are engaged dampen the effect of torsional vibrations on the friction plates by damping the metal to metal hammering of the splines and friction plate teeth.

It is an object of this invention to provide an improved damper.

It is another object of this invention to provide vibration dampers for the friction plates of disc clutches and brakes which resiliently support the friction plates on a splined member during disengaged operation to dampen the effect of torsional vibrations on the friction plates and which deflect to permit friction plate tooth and spline engagement during engaged operation and dampen friction plate tooth and spline hammering.

It is another object of this invention to provide a friction plate having teeth adapted to mesh with the splines of a splined member and an annulus of resilient material bonded to each side of the tooth portion of the friction plate providing resilient teeth having a normal clearance with the splines, the friction plate teeth having a larger than normal clearance with the splines so that the friction plate is carried on the splines by the projecting resilient teeth until a normal torque carried by the clutch plate deflects the resilient teeth to permit friction plate tooth and spline contact.

These and other objects of the invention will be more apparent from the following description and drawing of the preferred embodiment of the invention.

The vibration damper of this invention dampens the effect of torsional vibrations on the friction plates when the friction plates are engaged and disengaged and is illustrated as being adapted for the disc clutch of a transmission of the constant-mesh gear type where torsional vibrations excited by U-joints connecting the transmission to a load to be driven present a friction plate problem.

Figure 1:
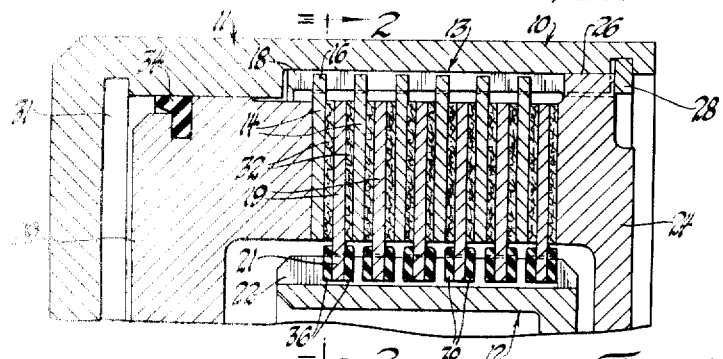
FIGURE 1 is a longitudinal sectional view taken through a portion of a disengaged disc clutch of a transmission embodying the damper of this invention.

Referring now to the drawing and particularly FIGURE 1, there is shown a portion of the upper half of a disc clutch generally designated at 10 of a transmission of the constant-mesh gear type comprising a metal drum 11 mounted for rotation on suitable bearings, not shown, and an internal annular metal hub 12 mounted for rotation on suitable bearings, not shown. The drum 11 which is the clutch driving member is adapted to be driven by an engine driven torque converter, not shown, and the hub 12 which is the clutch driven member is adapted to be drivingly connected via drive connecting means, including U-joints, not shown, to the load to be driven.

To clutch drum 11 to hub 12, there are provided a plurality of annular metal friction clutch plates generally designated at 13 comprising alternate clutch plates 14 which have external teeth 16 in mesh with internal teeth or splines 18 of drum 11 and intermediate clutch plates 19 which have internal teeth 21 in mesh with external teeth or splines 22 of hub 12. An annular backing plate 24 at its outer radius has teeth 26 in mesh with the drum splines 18 to prevent relative rotation between the backing plate 24 and drum 11. A retaining ring 28 mounted in an internal annular groove in drum 11 retains backing plate 24 in the drum 11.

An annular clutch apply piston 29 is mounted to slide inside the drum 11 and is normally urged leftwardly to a disengaged position by clutch release springs, not shown. When fluid under pressure is supplied to an apply chamber 31 at the left-hand end of piston 29, the piston 29 is moved rightwardly to squeeze together the clutch plates 19, which have friction facings 32, and the clutch plates 14 between the piston 29 and backing plate 24. With the clutch plates 14 and 19 engaged, relative rotation between drum 11 and hub 12 is prevented to establish a power path for torque transmittal between drum 11 and hub 12. An annular seal 34 carried on piston 29 prevents leakage from apply chamber 31 past the piston 29. When the fluid is exhausted from apply chamber 31, the clutch release springs return the piston 29 to its disengaged position and the clutch is disengaged.

Figure 2:
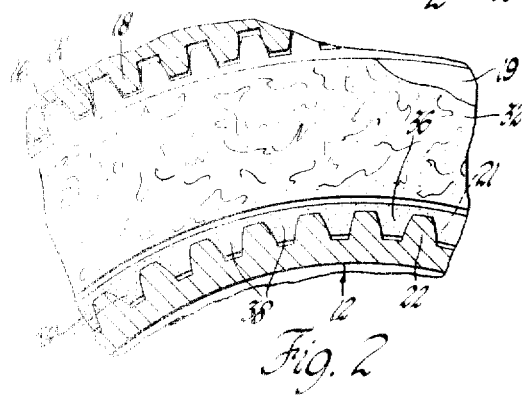
FIGURE 2 is a view taken on the line 2—2 in FIGURE 1.

The damper comprises an annulus 36 of resilient material, such as oil resistant synthetic rubber, bonded to each side of the toothed portion of clutch plates 19 as shown in FIGURES 1 and 2. The two annuli 36 of resilient material have tooth-shaped cutouts providing axially aligned resilient teeth 38 which sandwich the clutch plate teeth 21 and have tooth configurations similar to the clutch plate teeth 21. The axial thickness of each annulus 36 is less than one half of the sum of the axial thicknesses of two friction facings 32 and one clutch plate 14 so that the adjacent annuli 36 do not interfere with each other.

Figure 3:
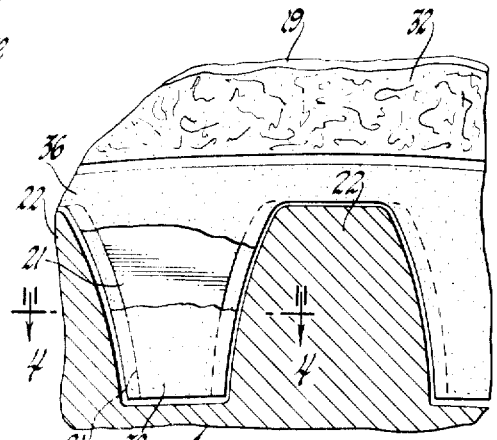
FIGURE 3 is an enlarged partial view of the damper taken from FIGURE 2.
Figure 4:
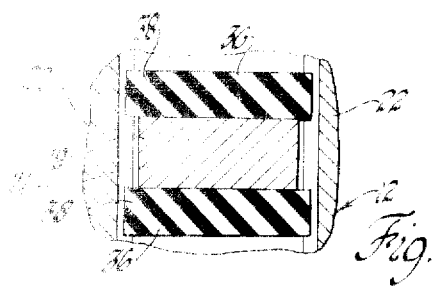
FIGURE 4 is a view taken on the line 4—4 in FIGURE 3.

As best shown by the enlarged view of FIGURES 3 and 4 which represent the clutch 10 as being disengaged, the clutch plate teeth 21 have a larger than normal clearance with respect to the hub splines 22 whereas the resilient teeth 38 have a normal clearance so that when the clutch 10 is disengaged, the clutch plates 19 are carried on the hub splines 22 by the resilient teeth 38 which project circumferentially beyond the clutch plate teeth 21. In this manner, the torsional vibrations excited by the U-joints during disengaged clutch running and transmitted by the hub 12 back to the clutch plates 19 are damped.

Figure 6:
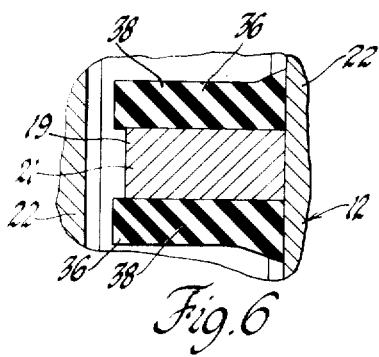
FIGURE 6 is a view taken on the line 6—6 in FIGURE 5.
Figure 5:
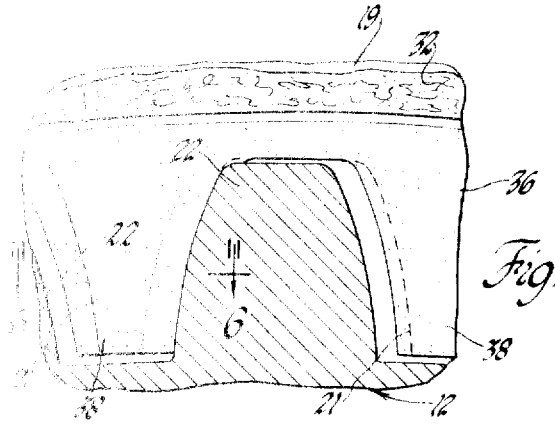
FIGURE 5 is the same view as shown in FIGURE 3 with the disc clutch engaged.

When the clutch 10 is engaged as represented by the enlarged views of FIGURES 5 and 6, the normal torque carried by the clutch plate 13 is sufficient to cause the hub splines 22 to compress the resilient teeth 38 and contact the clutch plate teeth 21 whereby the resilient teeth 38 cushion initial metal to metal contact of the clutch plate teeth 21 and hub splines 22. The compressed resilient teeth 38 while the clutch 10 is engaged dampen the effect of torsional vibrations on the clutch plates 19 which are excited by the U-joints and transmitted by the hub 12 by damping the metal to metal hammering of the clutch plate teeth 21 and splines 22.

The normal clearance between the resilient teeth 38 and hub splines 22 permits free axial movement of the clutch plates 19 relative to the hub 12 upon release of the clutch to ensure against clutch hang up. Where relative axial movement is not necessary, the resilient teeth 38 may have a snug or mild press fit on the hub splines 22.

While the invention has been illustrated in a disc clutch and particularly with regard to damping the torsional vibrations excited on the driven side of the disc clutch, it will be readily understood that the invention is applicable to other applications within the scope of the invention. For instance, the invention is readily adaptable to disc brakes and to damping torsional vibrations excited on the driving side of the clutch or brake as well as the driven side.

The above-described preferred embodiment is illustrative of the invention which may be modified within the scope of the appended claims.

I claim:

1. In combination, a first member, a second member encircling said first member, said members having meshing teeth for torque transmittal, one of said members having vibration dampening means comprising a unitary deformable tooth attached to each tooth of said one member and each unitary tooth meshing with adjacent teeth of the other member, said each unitary deformable tooth having edges which contact the adjacent teeth of said other member when said one member is torque unloaded whereby when said one member carries a normal torque load said deformable teeth deform at their teeth faces to permit engagement of the teeth members for torque transmittal.

2. In combination,
   (a) a friction plate, a splined member, said friction plate being annular and including an annular tooth portion having circumferentially spaced teeth meshing with the splines of said splined member,
   (b) a damper member of resilient material rigidly secured to said tooth portion having resilient teeth meshing with said splines, and
   (c) said resilient teeth and said friction plate teeth being similar in tooth configuration, said resilient teeth having a normal clearance with respect to said splines, said friction plate teeth having a larger than normal clearance with respect to said splines so that when said friction plate is torque unloaded said resilient teeth support said friction plate on said splined member, and when said friction plate carries a normal torque load said resilient teeth deflect to permit engagement of said friction plate teeth and said splines.

3. In combination,
   (a) a friction plate, a splined member, said friction plate being annular and including an annular tooth portion having circumferentially spaced teeth meshing with the splines of said splined member,
   (b) an annulus of resilient material rigidly secured to each side of said tooth portion having axially aligned resilient teeth sandwiching said friction plate teeth and meshing with said splines,
   (c) said resilient teeth and said friction plate teeth having similar configurations, said resilient teeth projecting circumferentially beyond said friction plate teeth to have a normal clearance with respect to said splines, said friction plate teeth having a larger than normal clearance with respect to said splines, and
   (d) said resilient teeth being deflectable in response to a normal torque load carried by said friction plate to permit said friction plate teeth and said splines to engage for torque transmittal, and when said normal torque load is relieved only said resilient teeth support said friction plate on said splined member.

4. The combination set forth in claim 3 and said annuli of resilient material being bonded to said toothed portion.

5. In combination,
   (a) an annular member, a splined member, said annular member including an annular tooth portion having circumferentially spaced teeth meshing with the splines of said splined member,
   (b) an annulus of resilient material rigidly secured to each side of said tooth portion having axially aligned resilient teeth sandwiching said annular member's teeth and meshing with said splines, (c) said resilient teeth and said annular member's teeth having similar configurations, said resilient teeth projecting circumferentially beyond said annular member's teeth to engage with said splines and prevent engagement of said annular member's teeth and said splines when there is no torque load on said annular member whereby said resilient teeth support said annular member on said splined member when there is no torque long on said annular member, and (d) said resilient teeth being deflectable in response to a normal torque load on said annular member to permit said annular member's teeth and said splines to engage.

References Cited by the Examiner

UNITED STATES PATENTS

| | | | |
|---|---|---|---|
| 1,648,110 | 11/1927 | Cartlidge | 192—55 |
| 2,118,913 | 5/1938 | Bachman | 192—69 |
| 2,575,765 | 11/1951 | Nabstedt et al. | 192—55 X |
| 2,899,038 | 8/1959 | Wellaver | 192—55 X |
| 2,904,150 | 9/1959 | Sand | 192—69 X |

FOREIGN PATENTS 1,218,011   12/1959   France.

DON A WAITE, *Primary Examiner.*

DAVID J. WILLIAMOWSKY, *Examiner.*